(12) United States Patent
Nabar et al.

(10) Patent No.: US 8,761,287 B2
(45) Date of Patent: *Jun. 24, 2014

(54) BEAMFORMING TO A SUBSET OF RECEIVE ANTENNAS IN A WIRELESS MIMO COMMUNICATION SYSTEM

(75) Inventors: Rohit U. Nabar, Santa Clara, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 175 days.

This patent is subject to a terminal disclaimer.

(21) Appl. No.: 12/871,692

(22) Filed: Aug. 30, 2010

(65) Prior Publication Data

US 2010/0322336 A1 Dec. 23, 2010

Related U.S. Application Data

(63) Continuation of application No. 11/627,265, filed on Jan. 25, 2007, now Pat. No. 7,787,554.

(60) Provisional application No. 60/796,848, filed on May 2, 2006.

(51) Int. Cl.
*H04B 7/02* (2006.01)
*H04B 1/40* (2006.01)

(52) U.S. Cl.
USPC ............................................. 375/267; 455/69

(58) Field of Classification Search
USPC ................. 375/259, 260, 262, 265, 267, 299; 455/24, 500, 68, 69, 88, 553.1, 101, 455/103
See application file for complete search history.

(56) References Cited

U.S. PATENT DOCUMENTS

| | | | |
|---|---|---|---|
| 6,760,388 B2 | 7/2004 | Ketchum et al. | |
| 7,065,146 B1 | 6/2006 | Lou et al. | |
| 2005/0265275 A1* | 12/2005 | Howard et al. | 370/328 |
| 2005/0287962 A1* | 12/2005 | Mehta et al. | 455/101 |
| 2006/0203785 A1 | 9/2006 | Kim | |
| 2007/0041457 A1 | 2/2007 | Kadous et al. | |
| 2007/0071127 A1 | 3/2007 | Gore et al. | |
| 2007/0071147 A1* | 3/2007 | Sampath et al. | 375/347 |
| 2008/0014870 A1 | 1/2008 | Kim | |
| 2009/0190684 A1* | 7/2009 | She et al. | 375/267 |
| 2009/0290563 A1* | 11/2009 | Gu et al. | 370/338 |

OTHER PUBLICATIONS

Mujtaba, S., IEEE 802.11 Wireless LANs, "TGn Sync Proposal Technical Specification" (2005).

IEEE Std 802.16a™-2003 (Amendment to IEEE Std. 802.16™-2001), "IEEE Standard for Local and Metropolitan area networks, Part 16: Air Interface for Fixed Broadband Wireless Access Systems—Amendment 2: Medium Access Control Modifications and Additional Physical Layer Specifications for 2-11 GHz," *The Institute of Electrical and Electronics Engineers, Inc.*, (2003).

(Continued)

*Primary Examiner* — Young T. Tse (57) ABSTRACT

In a method for controlling transmission of an information signal to a plurality of receive antennas associated with one or more receivers, a steering matrix is developed using a subset of receive antennas, wherein the subset of receive antennas includes less than all of the plurality of receive antennas. Transmission of the information signal via a plurality of transmit antennas is controlled using the steering matrix.

20 Claims, 9 Drawing Sheets

(56) References Cited

OTHER PUBLICATIONS

IEEE P802.11g/D8.2, Apr 2003 (Supplement to ANSI/IEEE Std 802.11 1999(Reaff 2003)), "IEEE P802.11g/D8.2, Draft Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," *Institute of Electrical and Electronics Engineers, Inc.*, (2003).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11 b-1999 (Supplement to ANSI/IEEE Std 802.11-1999 Edition) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band," *The Institute of electrical and electronics Engineers, Inc.*, (1999).

\* cited by examiner

BEAMFORMING TO A SUBSET OF RECEIVE ANTENNAS IN A WIRELESS MIMO COMMUNICATION SYSTEM

CROSS-REFERENCES TO RELATED APPLICATIONS

This application is a continuation of U.S. patent application Ser. No. 11/627,265, filed on Jan. 25, 2007, entitled "Beamforming to a Subset of Receive Antennas in a Wireless MIMO Communication System," now U.S. Pat. No. 7,787,554 which is based on and claims priority to U.S. Provisional Patent Application No. 60/796,848, filed on May 2, 2006, and entitled "Beamforming to a Subset of Receive Antennas in MIMO Systems." The entire disclosures of the applications referenced above are hereby incorporated by reference herein.

FIELD OF TECHNOLOGY

The present disclosure relates generally to wireless communication systems and, more particularly, to a method and system for beamforming while transmitting information in a multiple-input, multiple-output wireless communication system.

BACKGROUND

An ever-increasing number of relatively cheap, low power wireless data communication services, networks and devices have been made available over the past number of years, promising near wire speed transmission and reliability. Various wireless technology is described in detail in the 802.11 IEEE Standard, including for example, the IEEE Standard 802.11a (1999) and its updates and amendments, the IEEE Standard 802.11g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16a IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further compensate for deleterious effects associated with the various propagation paths, and to thereby improve transmission performance, it is also known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmission and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmitter antennas to produce high gain lobes in particular or predetermined directions. These techniques include, for example, transmit-MRC (maximum ratio combining) and singular value decomposition (SVD). While it is known to perform beamforming in a MIMO system in a manner that creates a beam pattern optimized with respect to all of the receiver antennas in the MIMO system or at least to all of the available receiver antennas, which thereby maximizes transmission reliability, the calculations and processing overhead associated with computing the beamsteering coefficients or the steering matrix increase significantly as the number of transmission and receiver antennas increases. As a result, beamforming in a MIMO system may significantly increase the system complexity and processing overhead when a large number of transmission and receiver antennas are present.

SUMMARY

In one embodiment, a method for controlling transmission of an information signal to a multiplicity of receive antennas associated with one or more receivers is disclosed. The method includes developing a steering matrix using a subset of receive antennas, wherein the subset of receive antennas includes less than all of the multiplicity of receive antennas. The method also includes controlling the transmission of the information signal via a plurality of transmit antennas using the steering matrix.

In another embodiment, an apparatus for use in transmitting an information signal to a plurality of receive antennas associated with one or more receivers is disclosed. The apparatus comprises a beamforming network coupled to a multiplicity of transmit antennas, and a controller coupled to the beamforming network, the controller to control the beamforming network using a steering matrix. A steering matrix calculation unit determines the steering matrix using a subset of receive antennas, the subset of receive antennas including less than all of the plurality of receive antennas.

In still another embodiment, an apparatus for use in transmitting an information signal from a plurality of transmit antennas to a plurality of receive antennas associated with one or more receivers is disclosed. The apparatus comprises a steering matrix calculation unit configured to determine a steering matrix using a subset of receive antennas, the subset of receive antennas including less than all of the plurality of receive antennas. A beamforming network coupled to the multiplicity of transmit antennas is controlled according to the steering matrix.

DETAILED DESCRIPTION

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards.

Figure 1:
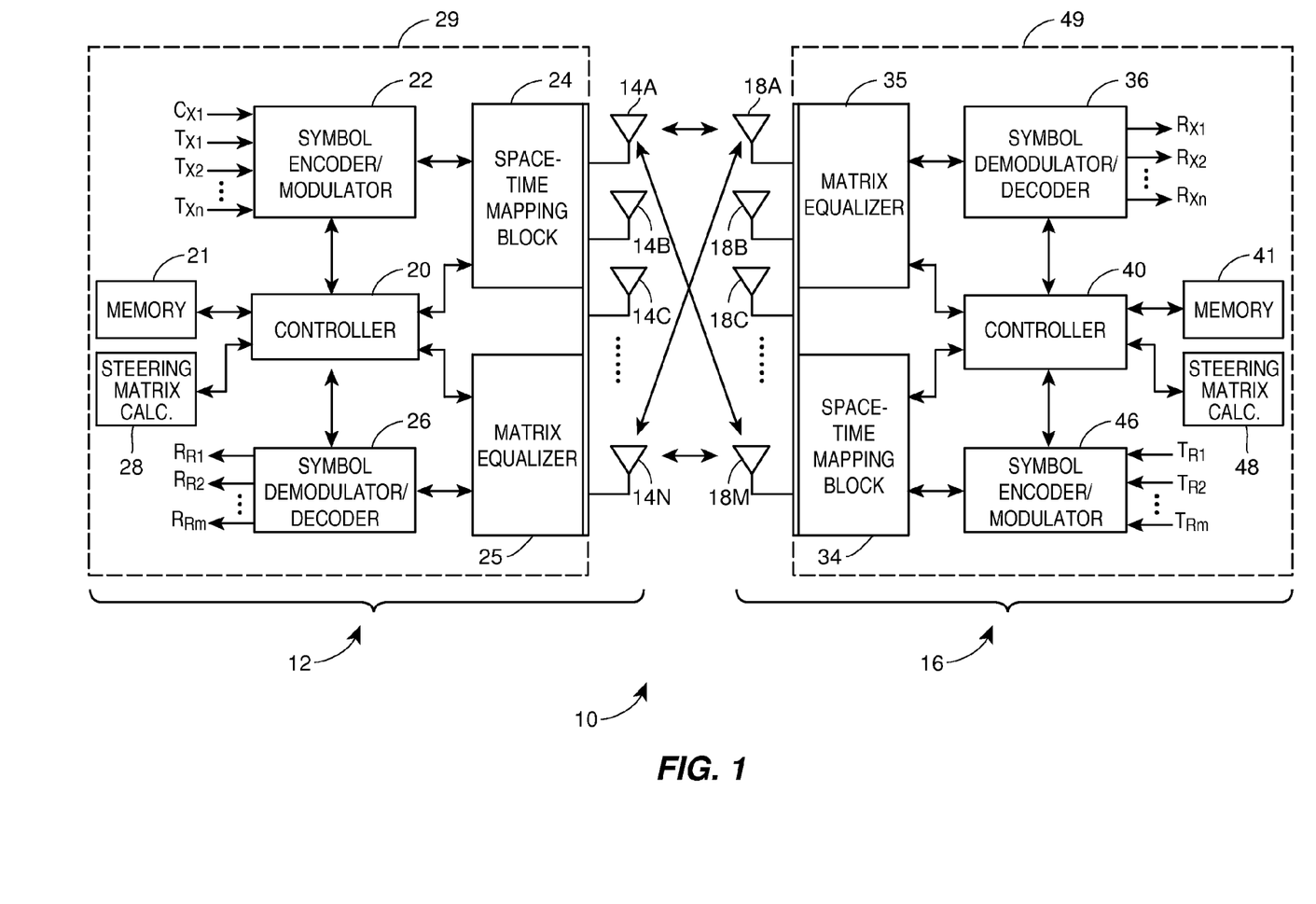
FIG. 1 is a block diagram of a wireless MIMO transmission system that implements a computationally reduced beamforming technique.

Referring now to FIG. 1, a MIMO communication system 10 is illustrated in block diagram form as generally including a single transmitter 12 having multiple transmission antennas 14A-14N and a single receiver 16 having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28. The controller 12 may be any desired type of controller and both the controller 12 and the steering matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the steering matrix calculation unit 28, the space-time mapping block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. If desired, the same control signal or a different control signal may be used to determine the CSI for each frequency and/or spatial channel used in the MIMO communication system 10.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the space-time mapping block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the space-time mapping block 24 in accordance with a beamforming technique more specifically described herein. Upon receiving the modulated signals, the space-time mapping block 24 or beamforming network processes the modulated signals by injecting delays and/or gains into the modulated signals based on a steering matrix provided by the controller 12, to thereby perform beamsteering or beamforming via the transmission antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$. In any event, a symbol demodulator and decoder unit 36, under control of a controller 40, may decode and demodulate the received symbol strings as processed by the matrix equalizer 35. In this process, these signals may be downconverted to baseband. Generally, the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The encoded and modulated symbol stream may then be upconverted and processed by a space-time mapping block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI for the various OFDM channel(s) may be used by the steering matrix calculation units 28 and 48 as well as by the controllers 20 and 40 to perform beamforming and to determine a steering matrix used by the space-time mapping blocks 24, 34. As noted above, the CSI, beamforming and other programs and data such as the steering matrix used by the units 28 and 48 and by the controllers 20 and 40 may be stored in the memories 21 and 41.

As is generally known, beamforming or beamsteering typically includes applying appropriate phases and gains to the various signals as sent through the multiple transmitter antennas 14A-14N, in a manner with causes the signals sent from the different transmitter antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the direction of propagation from the transmitter 12 to each of the receiver antennas 18A-18M of the receiver 16.

To implement beamforming in the transmitter 12, the steering matrix calculation unit 28 may determine or calculate a set of matrix coefficients (referred to herein as a steering matrix) which are used by the space-time mapping block 24 to condition the signals being transmitted by the antennas 14A-14N. If desired, the steering matrix for any particular frequency channel of the MIMO system 10 may be determined by the steering matrix calculation unit 28 based on the CSI determined for that channel (wherein the CSI is usually developed by and sent from the receiver 16). Moreover, the steering matrix calculation unit 28 may use any desired beam steering or matrix computation techniques, such as transmit-MRC or SVD techniques, to compute the steering matrix. As these techniques are well known in the art, they will not be discussed in detail herein. Generally speaking, however, the complexity and number of computations that are made to calculate the steering matrix increases as the number of transmission and/or receiver antennas increases.

Thus, as indicated above, the development of the steering matrix can be computationally expensive, and may require feedback (in the form of the CSI) from the receiver 16 to the transmitter 12, especially when there are numerous transmission antennas and receiver antennas. When performing beamforming, it is optimal to develop the steering matrix based on the availability of all of the operating receiver and transmitter antennas. Such a steering matrix generally creates a transmit beam pattern having a high gain lobe directed towards some combination of the receiver antennas as determined from for example the CSI. However, as the number of receiver and transmitter antennas increases, the required feedback and number of calculations that need to be performed to develop the optimal steering matrix increases significantly (e.g., exponentially).

To increase efficiency and to reduce the computational load associated with determining the steering matrix, the system of FIG. 1 may develop a steering matrix using less than all of the possible or operational receiver antennas by, for example, forming a transmit gain pattern having high gain lobes in the direction of only a subset of the receiver antennas for the receiver 16. This technique of considering or accounting for less than all of the possible or available receiver antennas to create the steering matrix for the transmitter 12 reduces the dimensionality of the computations associated with forming the steering matrix, and may reduce the amount of feedback that must be sent from the receiver 18 to the transmitter 12 in the form of, for example, CSI, used to perform beamforming.

Thus, for example, the controller 20 and/or the steering matrix calculation unit 28 of the transmitter 12 of FIG. 1 may implement beamforming (e.g., develop or create a steering matrix for the transmitter antennas 14A-14N) assuming that the receiver 16 has less than M receiver antennas, such as M-1, M-2, etc., wherein M may be determined based on some function of the CSI. This technique reduces the computations needed to create or develop the steering matrix used within the space-time mapping block 24 of the transmitter 12, which in turn may reduce the complexity of the hardware and/or the software used to implement the transmitter 12 and which may also increase the speed at which the transmitter 12 is able to transmit information or adapt to new channel conditions based on the receipt of new or updated CSI.

Figure 2:
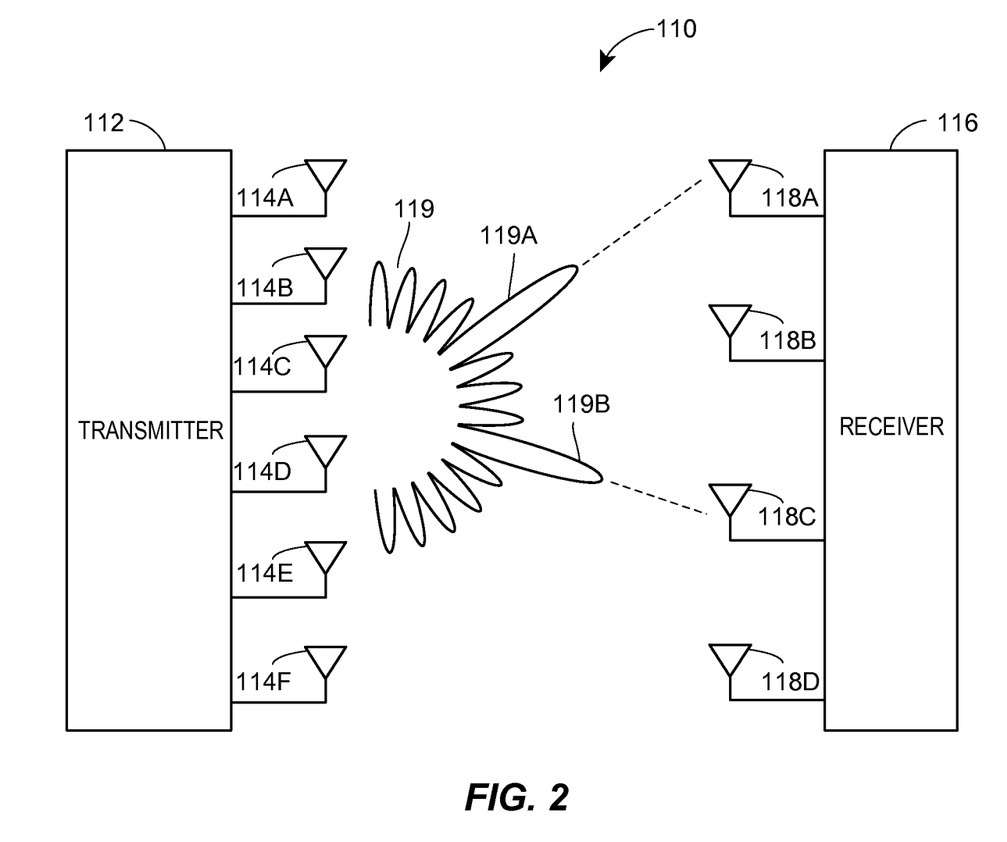
FIG. 2 is a block diagram illustrating a transmit gain pattern for wireless communications between a single transmitter and a single receiver using a computationally reduced beamforming technique.

To illustrate this beamforming technique, FIG. 2 illustrates a MIMO communication system 110 having a single transmitter 112 with six transmission antennas 114A-114F, and a single receiver 116 with four receiver antennas 118A-118D. In this example, the steering matrix is developed by the transmitter 112 using less than all of the possible receiver antennas 118A-118D to create a transmit gain pattern 119 as shown disposed next to the transmitter 112. As illustrated in FIG. 2, the transmit gain pattern 119 includes two high gain lobes 119A and 119B disposed in the direction of two of the receiver antennas (in this case the receiver antennas 118A and 118C), instead of separate high gain lobes directed to each of the receiver antennas 118A-118D which may be available based on, for example, the CSI. Moreover, the high gain lobes 119A and 119B are orientated in the directions of propagation from the transmitter 112 to the particular receiver antennas 118A and 118C while lower gain regions, which may even include one or more nulls, are produced in the direction of propagation from the transmitter 112 to the other receiver antennas 118B and 118D. While FIG. 2 illustrates a separate high gain lobe directed to each of the receiver antennas 118A and 118C, it will be understood that the actual gain pattern produced by the beam steering matrix calculations using less than all of the receiver antennas 118A-118D may not necessarily include a separate high gain lobe for each of the receiver antennas used in the calculations (in this case receiver antennas 118A and 118C). Instead, the gain pattern developed by the beam steering matrix for the transmitter 112 may have a single high gain lobe covering or directed generally to both of the receiver antennas 118A and 118C. Thus, it is to be understood that the beam pattern resulting from the creation of a steering matrix using less than all of the possible receiver antennas may or may not have separate high gain lobes separated by low gain regions or nulls for each of the receiver antennas used in the beam steering calculations.

Of course, developing the beam pattern 119 to have high gain regions and low gain regions based on less than all of the possible, available or existing receiver antennas may be performed in any desired manner. In particular, the exact number of receiver antennas which are to be used to develop the steering matrix may be selected by the steering matrix calculation unit 28 or by the controller 20 as a design variable to reduce system complexity or to reduce the computational requirements of the transmitter (or receiver). More particularly, the number of receiver antennas to be used in producing the steering matrix may be determined so as to limit the complexity or the size of the beam steering matrix and to thereby keep the computational load in calculating the steering matrix within a predetermined limit. For example, it is possible to select the number of receiver antennas to be used in the beam steering matrix calculations based on a predetermined matrix size or matrix dimensional limit, which limit is designed to keep the number of calculations or other measure of computational load in developing the steering matrix (given the number of transmission antennas for which the beam steering matrix is being formed) under a desired amount.

Alternatively, the particular number of receiver antennas and/or the location or identity of the particular receiver antennas to be used as the subset of receiver antennas when calculating the steering matrix may be selected to meet one or more predetermined performance characteristics and/or to optimize performance using the reduced number of receiver antennas within the beam steering calculations. For example, in one case, the number of and/or the identity of the particular receiver antennas used within the subset of possible receiver antennas may be selected or determined based on performance measures obtained using each of the possible subsets of available receiver antennas. In particular, during a test phase, the steering matrix calculation unit 28 of the transmitter 12 (of FIG. 1) may determine based on, for example, the CSI, all of the possible or available receiver antennas (which may be less than all actual receiver antennas as some receiver antennas may not be functioning correctly or be unavailable for other reasons), may then develop a steering matrix for each of a number of different combinations of available receiver antennas (e.g., for each of the possible combinations of a particular number of receiver antennas, such as each possible combination of two receiver antennas, three receiver antennas, etc.) and may then use these beam steering matrixes to send the control signal $C_{x1}$ or other known test signal to the receiver 16. The receiver 16 or some component thereof may determine which of the different combinations of receiver antennas operates to provide the best transmission/reception measures based on one or more quality factors, such as SNR, etc. If desired, the receiver 16 may send information back to the transmitter 12 indicative of one or more quality factors and allow the transmitter 12 to determine the various quality factors for each of the different steering matrixes. In any event, the steering matrix calculation unit 28 (or the unit 48 within the receiver 16) may use the quality factors to select the best subset of receiver antennas to use in calculating the steering matrix as being the subset that produced the steering matrix resulting in the best quality factor or combination of quality factors. On the other hand, the transmitter 12 (or the steering matrix calculation unit 28) may try a number of different possible combinations of receiver antennas until a combination is found that produces a particular desired level of performance. Of course, if desired, the number and/or identity of receiver antennas used in calculating the steering matrix may be determined in any other manner, including randomly, if so desired.

Figure 3:
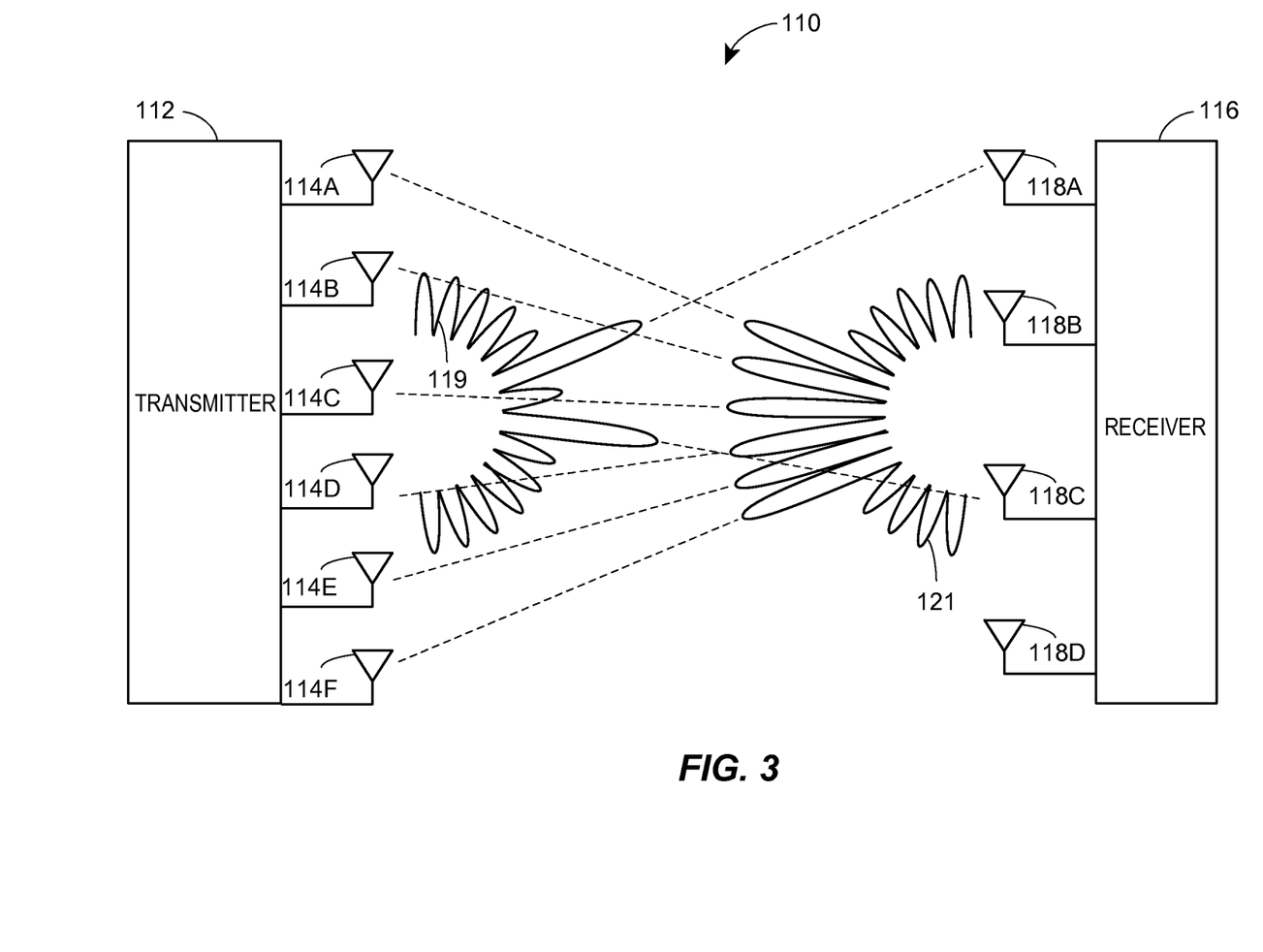
FIG. 3 is a block diagram illustrating transmitter and receiver transmit gain patterns for wireless communications between a single transmitter and a single receiver in which the transmitter uses a computationally reduced beamforming technique on the forward link while the receiver does not use a computationally reduced beamforming technique on the reverse link.

Moreover, beamforming may be performed in the transmitter of a particular transmitter/receiver combination of a MIMO system without being performed on the reverse link in the receiver of that particular transmitter/receiver combination. Moreover, each of the receiver antennas will be used to detect the signals transmitted by the transmitter, even though some of these receiver antennas may not be located in a high gain lobe of the transmit gain pattern associated with the transmitter. However, beamforming may also be performed on the reverse link in the receiver of a transmitter/receiver pair to further enhance the communication of signals from the receiver to the transmitter. An example of this situation is illustrated in FIG. 3, which shows the transmitter 112 and the receiver 116 of FIG. 2, along with a transmitter transmit gain pattern 119 (used on the forward link) and a receiver transmit gain pattern 121 (used on the reverse link). In this case, the process of forming the steering matrix at the transmitter 112 may be performed independently and differently than the process of forming the steering matrix at the receiver 116. In particular, while the transmitter 112 may develop a beam steering matrix using a particular subset of the possible receiver antennas (which may for example, result in a transmit beam pattern having two high gain lobes directed at two of the receiver antennas 118A-118D), the receiver 116 may calculate a beam steering matrix to produce a receive steering matrix which accounts for all of the possible transmitter antennas 114A-114F and which for example, results in the receiver transmit gain pattern 121 having a high gain lobe associated with (geographically directed at) each of the transmitter antennas 114A-114F.

Figure 4:
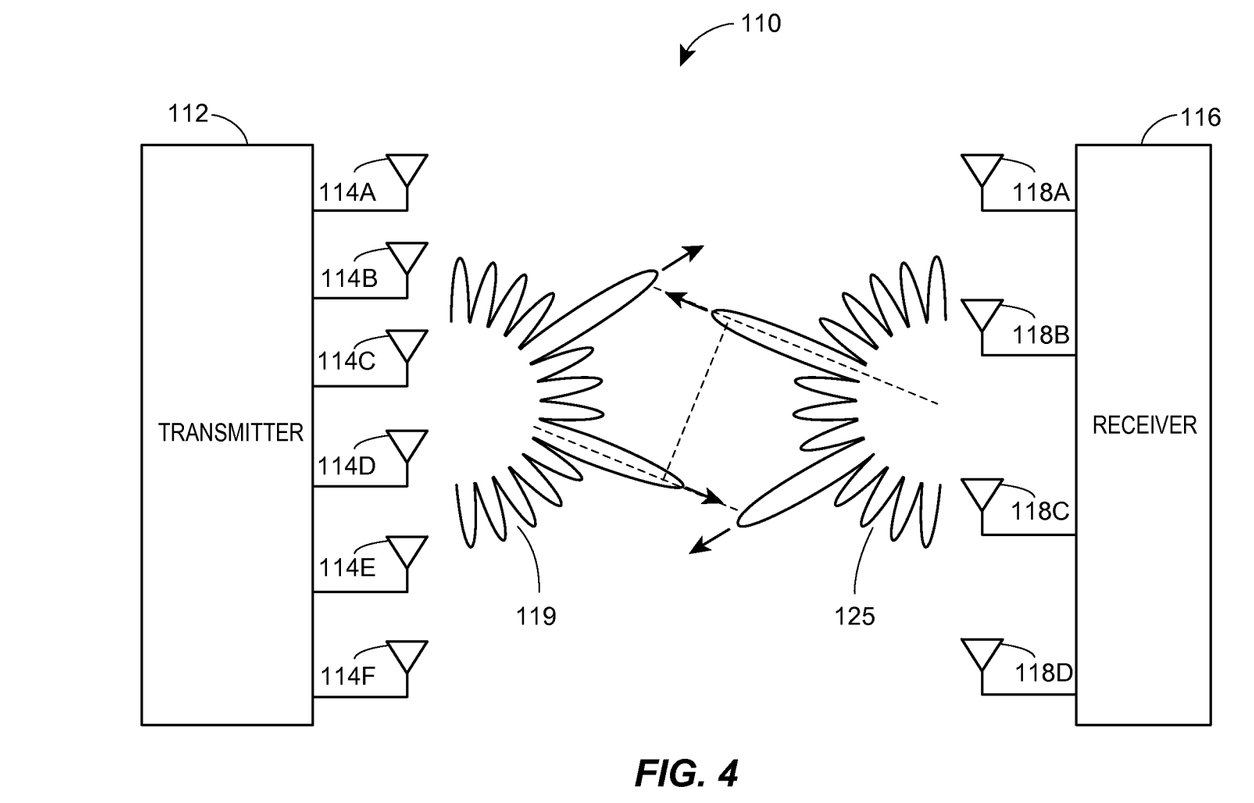
FIG. 4 is a block diagram illustrating transmitter and receiver transmit gain patterns for wireless communications between a single transmitter and a single receiver in which the transmitter and the receiver both use computationally reduced beamforming techniques when transmitting on the forward and the reverse links.

On the other hand, the receiver 116 may perform beam steering in the direction of the transmitter antennas 114A-114F on the reverse link using a subset of the transmitter antennas 114A-114F. If desired, the transmitter 112 and the receiver 116 may communicate with one another so as to coordinate the transmitter and receiver gain patterns, to thereby maximize reception quality factors. For example, the receiver 116 may know which of the receiver antennas 118A-118D were used to develop steering matrix for the transmitter 112, and may develop a steering matrix to be used at the receiver 116 that maximizes the transmission of signals from the receiver to the transmitter 112 at these particular antennas. Such a situation is illustrated in FIG. 4, which shows the system 110 of FIGS. 2 and 3 with a receiver transmit gain pattern 125 (used on the reverse link) having high gain lobes parallel to or pointed at the high gain lobes of the transmitter transmit gain pattern 119. However, in this case, each of the receiver antennas 118A-118D may still be used to receive signals from the transmitter 112 and each of the transmitter antennas 114A-114F may be used to receive signals from the receiver 116, as the reception and use of signals from these antennas will not decrease the quality of signal reception, and will typically increase the reception quality and reliability, even if only slightly.

The use of a beamforming technique using a subset of the receiver antennas which is less than all of the possible or available receiver antennas can, in certain instances, significantly reduce the computational complexity needed to perform the steering matrix calculations, as well as reduce the amount of feedback required to perform beamsteering, as less CSI may need to be sent from the receiver to the transmitter. In many cases, steering to a subset of the receiver antennas (which is less than all of the possible or available receiver antennas) can give almost the same performance as beamforming to all the receiver antennas while significantly reducing the computation complexity and thereby increasing the speed of the transmit system and/or reducing the hardware complexity of the transmit system.

It will be understood that the actual beamforming or steering matrix equations, e.g., the computation of the steering matrix, may be performed at any desired location within the wireless communication system 10 of FIG. 1, including within the controller 20 or other hardware, software, or firmware of the transmitter 12, as well as within the controller 40 or other hardware, software, or firmware of the receiver 16. In the later case, the receiver 16 may compute the steering matrix to be used by the transmitter 12 based on CSI developed by the receiver 16 and may send the actual steering matrix to the transmitter 12 to be used in transmitting information to the receiver 16. On the other hand, the steering matrix for the transmitter space-time mapping block 24 of FIG. 1 may be calculated by the steering matrix calculation unit 28 within the transmitter 12 based on the CSI provided and sent back from the receiver 16 to the transmitter 12.

Figure 5:
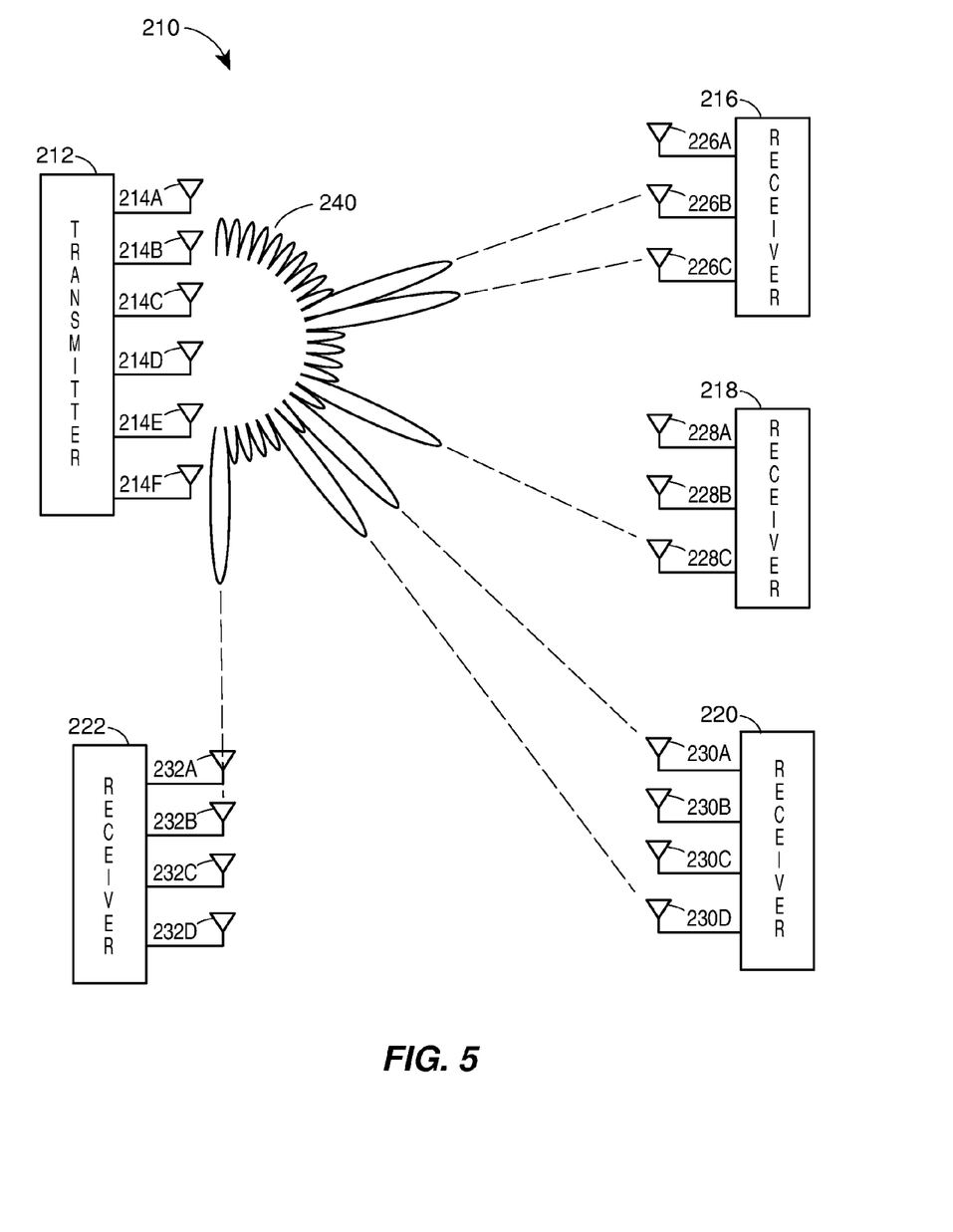
FIG. 5 is a block diagram illustrating a transmit gain pattern for wireless communications between a single transmitter and a multiple receivers using a computationally reduced beamforming technique.

Of course, the beamforming technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. For example, FIG. 5 illustrates a MIMO system 210 in which a single transmitter 212 having multiple (in this example six) transmission antennas 214A-214F transmits to multiple receivers 216, 218, 220 and 222, each having multiple receiver antennas 226A-226C, 228A-228C, 230A-230D, and 232A-232D, respectively. While shown in this example as including three or four receiver antennas, any or all of the receivers 216, 218, 220, 222 of FIG. 5 could include different numbers of receiver antennas, including only a single receiver antenna if so desired. In any event, as illustrated by the transmit gain pattern 240 illustrated in FIG. 5, the steering matrix calculated and used by the transmitter 212 is formed using a subset of all of the possible receiver antennas, which subset includes less than all of the possible receiver antennas.

In this case, the transmitter steering matrix is calculated using the receiver antennas 226B, 226C, 228C, 230A, 230D, 232B and 232D, so that, as shown by the transmit gain pattern 240, a high gain lobe is directed to at least one receiver antenna of each of the receivers 216, 218, 220, 222, but not necessarily to all of the receiver antennas of each of the receivers 216, 218, 220, 222, and not necessarily to all of the receiver antennas for any particular one of the receivers 216, 218, 220, 222. Thus, as illustrated in FIG. 5, the steering matrix for the transmitter 212 is determined in such a manner that a separate high gain lobe is directed to each of the receiver antennas 226B, 226C, 228C, 230A and 230D. However, due to the physical location of the receiver 222 and its antennas with respect to the transmitter 212, a single high gain lobe is directed to the receiver antennas 232B and 232D, resulting in a single high gain lobe in the transmit gain pattern 240 directed to both of these receiver antennas.

While, in many cases, it will be desirable to include at least one receiver antenna from each receiver within the subset of receiver antennas used to create the steering matrix for the transmitter, it may not be necessary to implement this configuration in all cases. For example, a particular receiver may be in a direct line of sight from the transmitter to another receiver and therefore may be disposed in a high gain region of the transmitter and may thus adequately receive the transmitted signals from the transmitter without having any of the receiver antennas for that particular receiver considered when developing the steering matrix for the transmitter. As another example, a particular receiver may be disposed in a low gain region associated with the transmitter, but may be disposed relatively close to the transmitter so that the particular receiver adequately receives the signals transmitted by the transmitter without having any of the receiver antennas for that particular receiver considered when developing the steering matrix for the transmitter. Of course, as noted above the number and location (identity) of the receiver antennas to be used in calculating the transmitter steering matrix can be determined in any manner, including by trial and error, in determining an acceptable or optimal steering matrix using less than all of the possible receiver antennas. Still further, while the maximum gain of the high gain lobes of each of the transmitter and receiver transmit gain patterns shown in FIGS. 2-5 is shown as being the same, the steering matrix calculation units 28 and 48 may develop steering matrixes which produce high gain lobes with differing maximum gains.

While the beamforming and steering matrix calculations described herein are described in one example as being implemented in software stored in, for example, one of the memories 21, 41 and implemented on a processor associated with one or both of the controllers 20, 40 of the MIMO communication system 10 of FIG. 1, these routines may alternatively or additionally be implemented in digital or analog hardware, firmware, application specific integrated circuits, etc., as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

The present invention may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 6A-6H, various exemplary implementations of the present invention are shown.

Figure 6A:
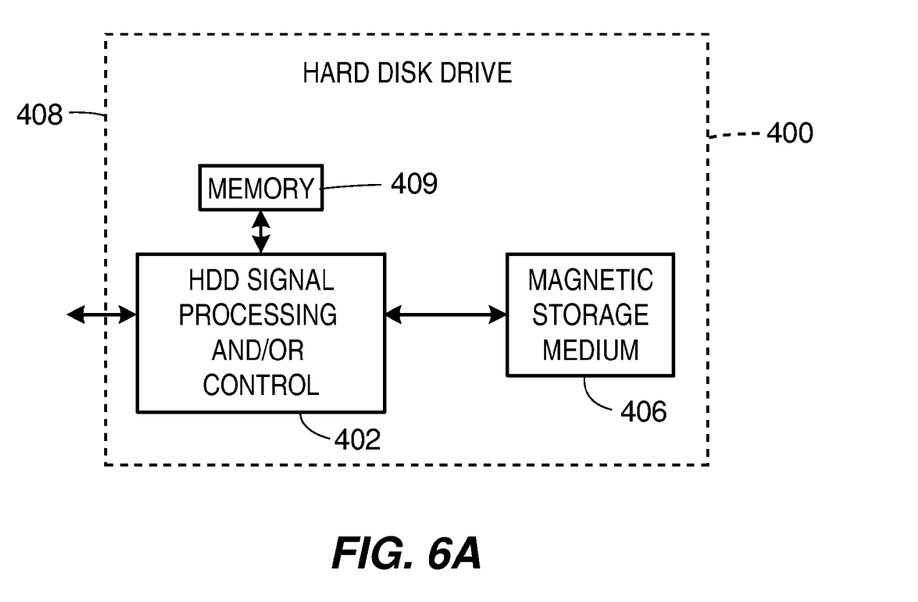
FIGS. 6A-6H illustrate examples of various different devices in which a wireless communication system implementing the beamforming techniques described herein may be used.

Referring to FIG. 6A, the present invention may be used with a hard disk drive 400 which includes both signal processing and/or control circuits, which are generally identified in FIG. 6A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408 which may implement the beamforming techniques described above. HDD 400 may be connected to memory 409, such as random access memory (RAM), a low latency nonvolatile memory such as flash memory, read only memory (ROM) and/or other suitable electronic data storage.

Figure 6B:
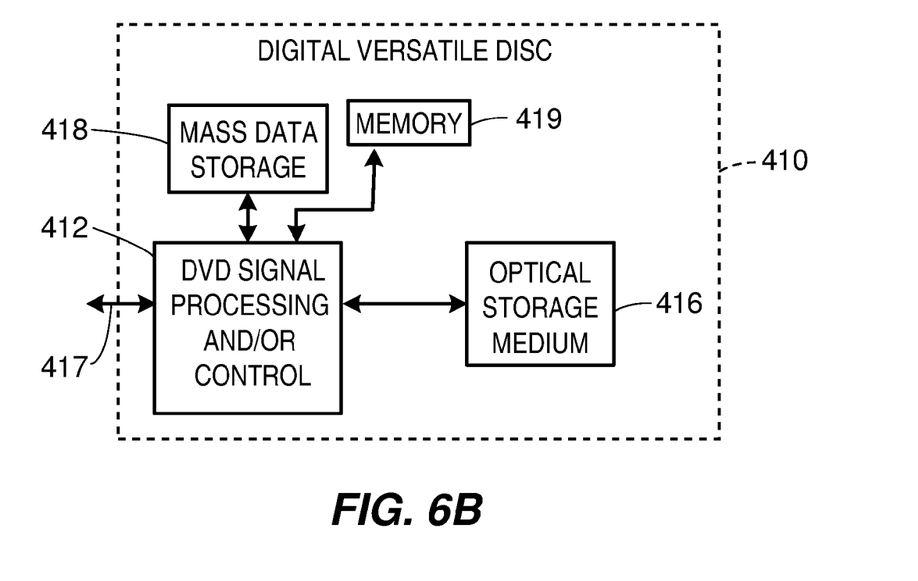

Referring now to FIG. 6B, the present invention may be embodied in or used with a digital versatile disc (DVD) drive 410 which may include either or both signal processing and/or control circuits, which are generally identified in FIG. 6B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417 which may be implemented using the beamforming techniques described above. DVD 410 may communicate with mass data storage 418 that stores data in a nonvolatile manner. Mass data storage 418 may include a hard disk drive (HDD) such as that shown in FIG. 6A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

Figure 6C:
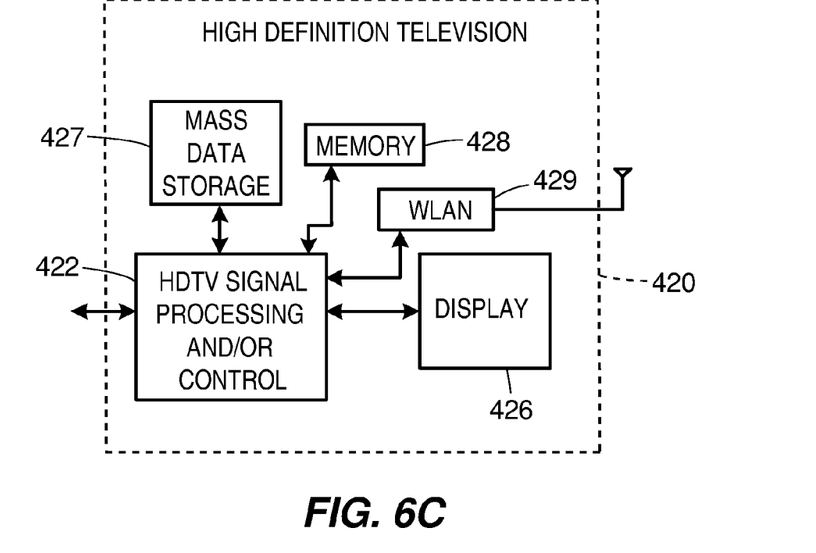

Referring now to FIG. 6C, the present invention may be embodied in a high definition television (HDTV) 420 which may include either or both signal processing and/or control circuits, which are generally identified in FIG. 6C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429 which may implement the beamforming techniques described above.

Figure 6D:
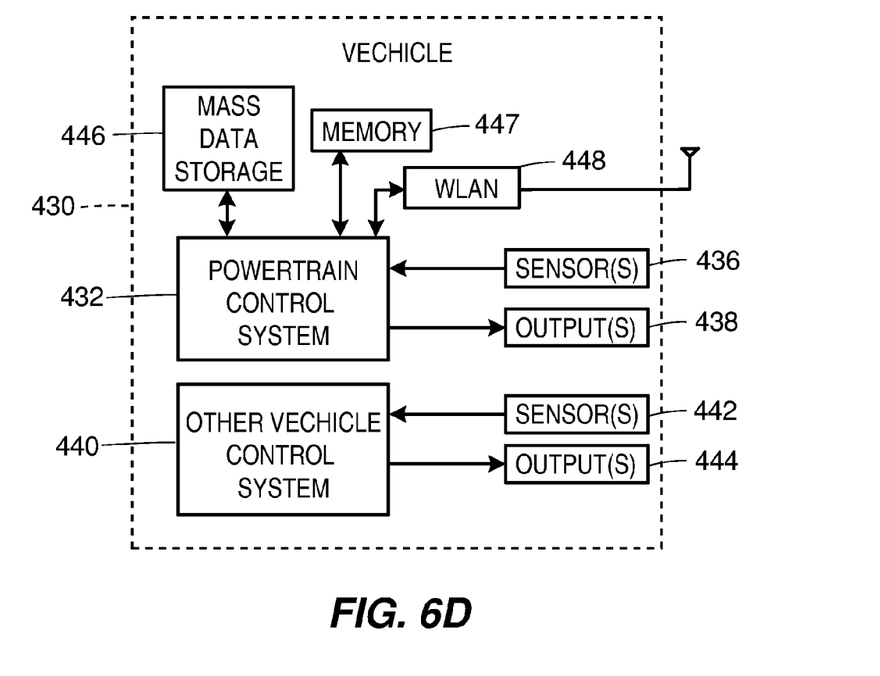

Referring now to FIG. 6D, the present invention may be used in conjunction with a control system of a vehicle 430 having a WLAN interface and/or mass data storage. In some implementations, the present invention may be used within a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448 which may implement the beamforming techniques described above. The control system 440 may also include mass data storage, memory and/or a WLAN interface (all not shown).

Figure 6E:
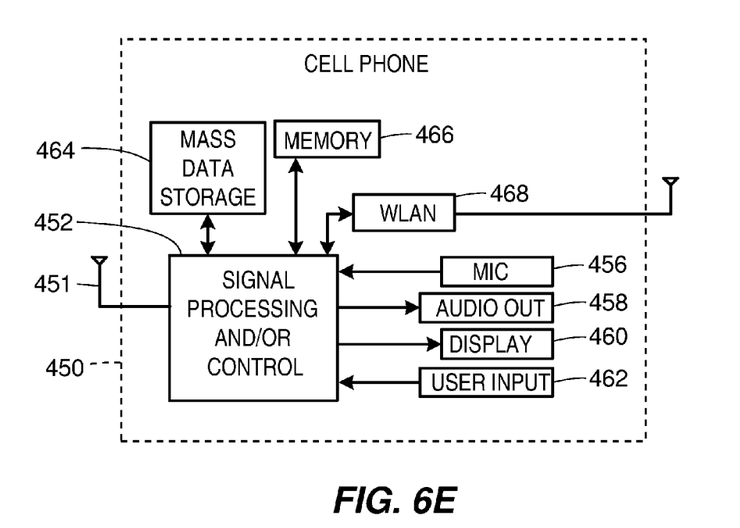

Referring now to FIG. 6E, the present invention may be embodied in a cellular phone 450 that may include one or more cellular antennas 451, either or both signal processing and/or control circuits, which are generally identified in FIG. 6E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 6F:
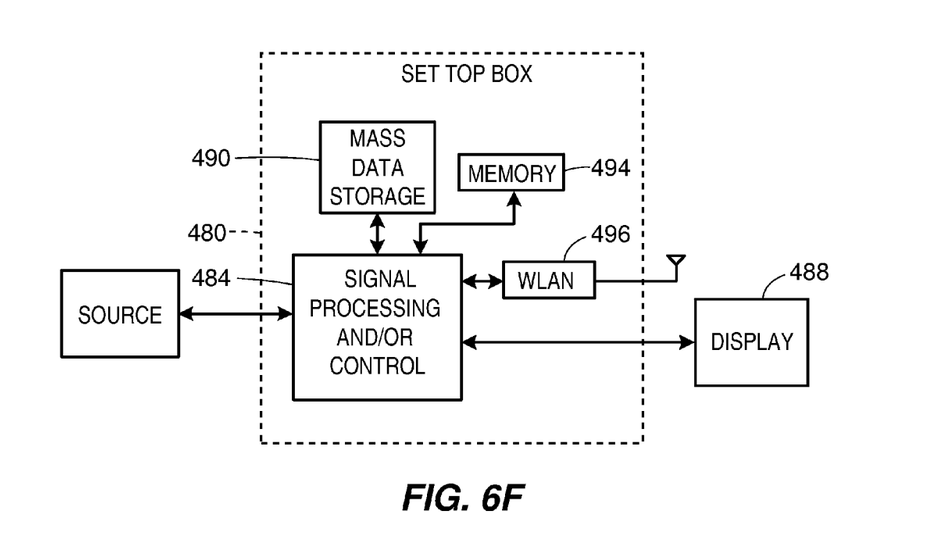

Referring now to FIG. 6F, the present invention may be embodied in a set top box 480 including either or both signal processing and/or control circuits, which are generally identified in FIG. 6F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496 which may implement the beamforming techniques described herein.

Figure 6G:
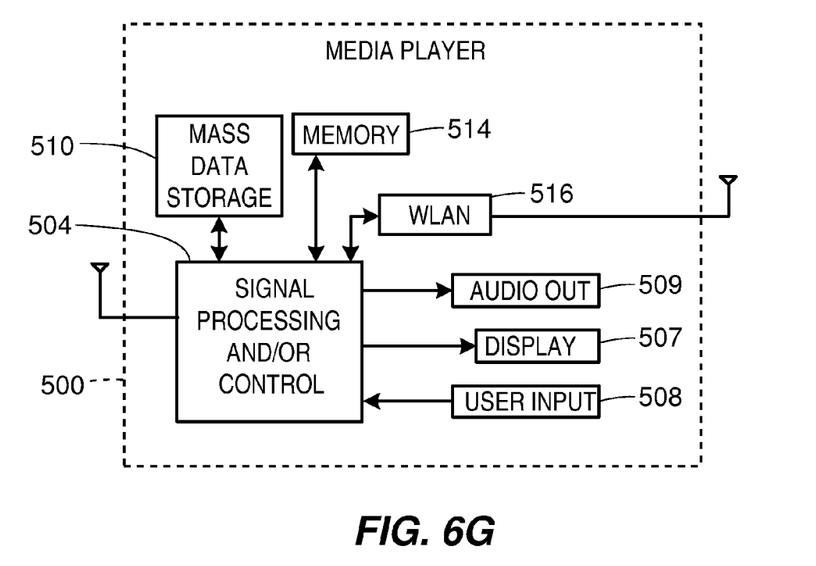

Referring now to FIG. 6G, the present invention may be embodied in a media player 500. The present invention may implement either or both signal processing and/or control circuits, which are generally identified in FIG. 6G at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516 which may implement the beamforming techniques described herein. Still other implementations in addition to those described above are contemplated.

Figure 6H:
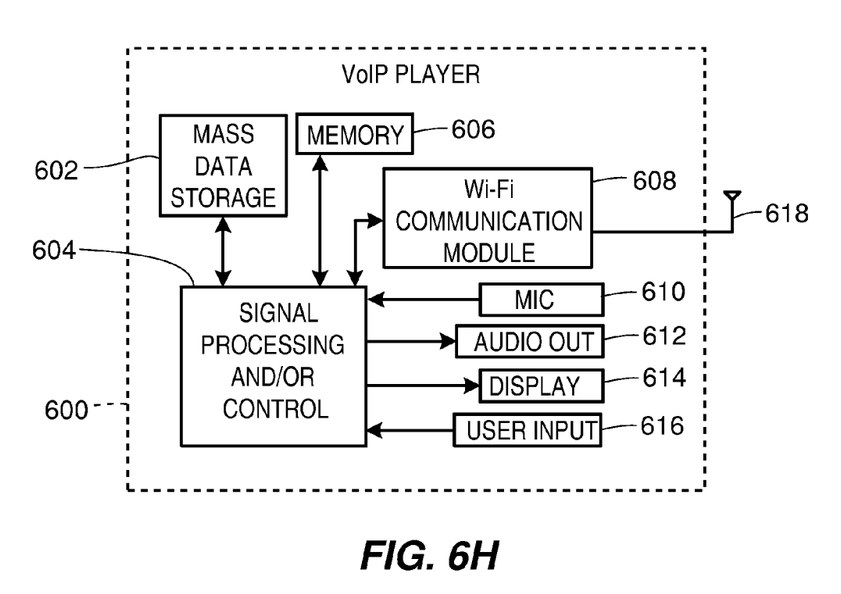

Referring to FIG. 6H, the present invention may be embodied in a Voice over Internet Protocol (VoIP) phone 600 that may include one or more antennas 618, either or both signal processing and/or control circuits, which are generally identified in FIG. 6H at 604, and a wireless interface and/or mass data storage of the VoIP phone 600. In some implementations, VoIP phone 600 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 600 may process data, perform coding and/or encryption, perform calculations, format data and/or perform other VoIP phone functions.

VoIP phone 600 may communicate with mass data storage 602 that stores data in a nonvolatile manner such as optical and/or magnetic storage devices, for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". VoIP phone 600 may be connected to memory 606, which may be a RAM, ROM, low latency nonvolatile memory such as flash memory and/or other suitable electronic data storage. VoIP phone 600 is configured to establish communications link with a VoIP network (not shown) via Wi-Fi communication module 608 which may implement the beamforming techniques described herein.

Moreover, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A method for controlling transmission of an information signal from a first communication device to at least one second communication device, the method comprising:
selecting a subset of receive antennas of the at least one second communication device from a plurality of different subsets of the receive antennas of the at least one second communication device;
developing a steering matrix using the selected subset of the receive antennas; and
controlling, using the steering matrix, the transmission of the information signal from the plurality of transmit antennas of the first communication device to the at least one second communication device,
wherein selecting the subset of the receive antennas includes one of:
(i) randomly selecting the subset of the receive antennas from the plurality of different subsets of the receive antennas, or
(ii) selecting the subset of the receive antennas, from the plurality of different subsets of the receive antennas, that provides best transmission quality if:
(iia) the selected subset of the receive antennas is subsequently used to develop the steering matrix, and
(iib) the steering matrix is subsequently used to control the transmission of the information signal from a plurality of transmit antennas at the first communication device to the at least one second communication device.

2. The method of claim 1, wherein developing the steering matrix includes computing the steering matrix at a transmitter that transmits the information signal via the plurality of transmit antennas.

3. The method of claim 1, wherein developing the steering matrix includes:
computing the steering matrix at the at least one second communication device; and
transmitting the steering matrix from the at least one second communication device to the first communication device,
wherein a transmitter of the first communication device is configured to transmit the information signal via the plurality of transmit antennas using the steering matrix.

4. The method of claim 1, wherein selecting the subset of the receive antennas, from the plurality of different subsets of the receive antennas, that provides the best transmission quality is based on an optimality criterion.

5. The method of claim 4, wherein selecting the subset of the receive antennas based on the optimality criterion includes:
developing two or more test steering matrixes using at least two of the plurality of different subsets of the receive antennas;
transmitting two or more test signals to a receiver, wherein each of the two or more test signals is transmitted using a respective one of the two or more test steering matrixes;
determining a respective quality factor associated with transmitting each of the two or more test signals to define a plurality of determined quality factors; and
selecting one of the at least two of the plurality of different subsets of the receive antennas as the subset of the receive antennas based on the plurality of determined quality factors.

6. The method of claim 1, wherein the subset of the receive antennas includes multiple receive antennas.

7. The method of claim 1, further comprising modulating the information signal.

8. A first communication device comprising:
a beamforming network coupled to a plurality of transmit antennas; and
a controller coupled to the beamforming network, the controller configured to control the beamforming network using a steering matrix;
wherein a steering matrix calculation unit determines the steering matrix using a subset of receive antennas of at least one second communication device from a plurality of different subsets of the receive antennas of the at least one second communication device, wherein the steering matrix calculation unit is configured to select the subset of the receive antennas at least by one of:
(i) randomly selecting the subset of the receive antennas from the plurality of different subsets of the receive antennas, or
(ii) selecting the subset of the receive antennas, from the plurality of different subsets of the receive antennas, that provides best transmission quality if:
(iia) the selected subset of the receive antennas is subsequently used to develop the steering matrix, and
(iib) the steering matrix is subsequently used to control the transmission of an information signal from the plurality of transmit antennas to the at least one second communication device.

9. The first communication device of claim 8, wherein the steering matrix calculation unit is disposed within the at least one second communication device.

10. The first communication device of claim 8, wherein the steering matrix calculation unit is disposed within the first communication device.

11. The first communication device of claim 8, wherein the steering matrix calculation unit is further configured to determine the steering matrix using at least one of i) transmit-MRC (maximum ratio combining) and ii) singular value decomposition (SVD).

12. The first communication device of claim 8, wherein the steering matrix calculation unit is further configured to select the subset of the receive antennas, from the plurality of different subsets of the receive antennas, that provides the best transmission quality based on an optimality criterion.

13. The first communication device of claim 8, wherein:
a plurality of test signals are transmitted with the plurality of transmit antennas using a plurality of respective test steering matrixes, wherein each test steering matrix corresponds to one of the plurality of different subsets of the receive antennas; and
the steering matrix calculation unit is further configured to (i) determine a respective quality factor associated with each of the plurality of test signals to define a plurality of determined quality factors and (ii) select one of the plurality of different subsets of the receive antennas as the subset of the receive antennas based on the plurality of determined quality factors.

14. The first communication device of claim 13, wherein the subset of the receive antennas includes multiple receive antennas.

15. The first communication device of claim 8, wherein the steering matrix calculation unit is further configured to develop the steering matrix based at least in part on channel state information associated with a transmission channel between a wireless transmitter and a receiver.

16. The first communication device of claim 8, further comprising a signal modulator configured to modulate the information signal.

17. A first communication device comprising:
a steering matrix calculation unit configured to determine a steering matrix using a subset of receive antennas of at least one second communication device from a plurality of different subsets of the receive antennas of the at least one second communication device, wherein the steering matrix calculation unit is configured to select the subset of the receive antennas at least by one of:
(i) randomly selecting the subset of the receive antennas from the plurality of different subsets of the receive antennas, or
(ii) selecting the subset of the receive antennas, from the plurality of different subsets of the receive antennas, that provides best transmission quality if:
(iia) the selected subset of the receive antennas is subsequently used to develop a steering matrix, and
(iib) the steering matrix is subsequently used to control the transmission of an information signal from a plurality of transmit antennas at the first communication device to the at least one second communication device; and
a beamforming network coupled to the plurality of transmit antennas and controlled by a controller using the steering matrix.

18. The first communication device of claim 17, wherein the steering matrix calculation unit is further configured to determine the steering matrix using at least one of i) transmit-MRC (maximum ratio combining) and ii) singular value decomposition (SVD).

19. The first communication device of claim 17, wherein the steering matrix calculation unit is further configured to select the subset of the receive antennas, from the plurality of different subsets of the receive antennas, that provides the best transmission quality based on an optimality criterion.

20. The first communication device of claim 17, wherein:
a plurality of test signals are transmitted with the plurality of transmit antennas using a plurality of respective test steering matrixes, wherein each test steering matrix corresponds to one of the plurality of different subsets of the receive antennas; and
the steering matrix calculation unit is further configured to (i) determine a respective quality factor associated with each of the plurality of test signals to define a plurality of determined quality factors, and (ii) select one of the plurality of different subsets of the receive antennas as the subset of the receive antennas based on the plurality of determined quality factors.

\* \* \* \* \*